(12) United States Patent
Berstis

(10) Patent No.: US 7,558,442 B2
(45) Date of Patent: *Jul. 7, 2009

(54) SYSTEM AND METHOD FOR ANTI-MOIRE' IMAGING IN A ONE DIMENSIONAL SENSOR ARRAY

(75) Inventor: Viktors Berstis, Austin, TX (US)

(73) Assignee: InfoPrint Solutions Company, LLC, Boulder, CO (US)

(*) Notice: Subject to any disclaimer, the term of this patent is extended or adjusted under 35 U.S.C. 154(b) by 19 days.

This patent is subject to a terminal disclaimer.

(21) Appl. No.: 11/554,688

(22) Filed: Oct. 31, 2006

(65) Prior Publication Data

US 2007/0053612 A1    Mar. 8, 2007

Related U.S. Application Data

(63) Continuation of application No. 10/015,880, filed on Dec. 13, 2001, now Pat. No. 7,176,969.

(51) Int. Cl.
G06K 9/32 (2006.01)
H04N 3/14 (2006.01)

(52) U.S. Cl. ...................................... 382/300; 348/294
(58) Field of Classification Search .................. 382/300
See application file for complete search history.

(56) References Cited

U.S. PATENT DOCUMENTS

| | | | | |
|---|---|---|---|---|
| 4,071,848 A | * | 1/1978 | Leeper | 343/844 |
| 4,559,605 A | * | 12/1985 | Norsworthy | 708/403 |
| 4,574,311 A | * | 3/1986 | Resnikoff et al. | 348/315 |
| 4,607,287 A | * | 8/1986 | Endo et al. | 348/219.1 |
| 4,998,164 A | * | 3/1991 | Endo et al. | 348/219.1 |
| 5,489,940 A | * | 2/1996 | Richardson et al. | 348/315 |
| 5,673,376 A | * | 9/1997 | Ray et al. | 345/427 |
| 5,818,977 A | * | 10/1998 | Tansley | 382/294 |
| 5,847,398 A | * | 12/1998 | Shahar et al. | 250/370.09 |
| 5,949,922 A | * | 9/1999 | Wada et al. | 382/295 |
| 6,611,627 B1 | * | 8/2003 | LaRossa et al. | 382/240 |

(Continued)

OTHER PUBLICATIONS

Balph, Tom, LFSR counters implement binary polynomial generators, May 21, 1998, EDN, http://edn.com/archives/1998/052198/11df_06.htm.*

*Primary Examiner*—Matthew C. Bella
*Assistant Examiner*—Sath V. Perungavoor
(74) *Attorney, Agent, or Firm*—Robert H. Frantz; David A. Mims, Jr.; Dale M. Crockatt

(57) ABSTRACT

A device and process which eliminates potential moiré patterns in digitized images by employing a one-dimensional sensor array and a sampling method of the sensor signals which produces a data set of non-uniformly spaced sensor positions. This allows the spacing of the sensors to avoid having a strong "harmonic" which may interfere with details or harmonics present in the image source, which eliminates the occurrence of moiré patterns and the need for application of image processing to remove moiré patterns. Sensors are non-uniformly spaced along a first axis according to a predetermined, deterministic and predictable schema or function. Sensors are sampled during scanning according a non-uniform function in order to realize a non-uniform sampling scheme in a second dimension. Linear interpolation is applied to the non-uniformly spaced data set, synthesizing a uniformly-spaced data set for use in common imaging formats and processing.

18 Claims, 7 Drawing Sheets

U.S. PATENT DOCUMENTS

| | | | |
|---|---|---|---|
| 6,633,331 B1 * | 10/2003 | Potter et al. | 348/207.11 |
| 6,784,856 B2 * | 8/2004 | Berstis | 345/55 |
| 6,873,338 B2 * | 3/2005 | Berstis | 345/596 |
| 6,956,975 B2 * | 10/2005 | Young | 382/263 |
| 7,009,645 B1 * | 3/2006 | Sandini et al. | 348/275 |
| 7,173,658 B2 * | 2/2007 | Kikuchi | 348/275 |
| 7,173,659 B2 * | 2/2007 | Berstis | 348/294 |
| 7,176,969 B2 * | 2/2007 | Berstis | 348/294 |
| 7,492,935 B2 * | 2/2009 | Glukhovsky | 382/128 |
| 2003/0112474 A1 * | 6/2003 | Berstis | 358/471 |
| 2003/0132895 A1 * | 7/2003 | Berstis | 345/55 |
| 2003/0184665 A1 * | 10/2003 | Berstis | 348/294 |
| 2006/0215049 A1 * | 9/2006 | Sandini et al. | 348/275 |
| 2007/0053612 A1 * | 3/2007 | Berstis | 382/294 |

* cited by examiner

SYSTEM AND METHOD FOR ANTI-MOIRE' IMAGING IN A ONE DIMENSIONAL SENSOR ARRAY

CROSS-REFERENCE TO RELATED APPLICATIONS (CLAIMING BENEFIT UNDER 35 U.S.C. 120)

This patent application is a continuation of U.S. patent application Ser. No. 10/015,880, filed on Dec. 13, 2001 now U.S. Pat. No. 7,176,969 but Viktors Berstis.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

None.

BACKGROUND OF THE INVENTION

1. Field of the Invention

This patent application is a continuation of U.S. patent application Ser. No. 10/015,880, filed on Dec. 13, 2001 now U.S. Pat. No. 7,176,969 but Viktors Berstis, which is currently under allowance. This invention relates to the arts of imaging and image processing, including sensor design and moiré reduction technologies.

2. Background of the Invention

Well-known imaging technologies include film (e.g. analog), digital, and analog-digital hybrid approaches. Film imaging processes use a set of lenses to focus an image onto a film sheet which is impregnated with grains of material reactive to the spectrum to be recorded, such as visible light, infrared ("IR"), or X-ray. The grains are randomly arranged in each sheet of film, and thus reproduction of the image on the developed film has a certain resolution based on the size and density of these grains.

In digital imaging, a sensor of uniformly-arranged sensing elements is used to capture "bits" or pixels of the image. Turning to FIG. 1, the system components (10) of a flatbed scanner are shown, which are commonly used to scan photographs and other analog images into digital data files. In this example, a document (1) is imaged using a one-row wide reflective element (3) such as a thin mirror, which is moved lengthwise (e.g. column-wise) (4, 4') along the length of the document (1) in discrete steps by a stepper motor drive (2). At each step along the length of the document, a single row of image data is captured by a linear sensor array (7) upon which an image from the document is focused by a lens (6) via an optical path from the document, across the mirror (3), through the lens, and to the sensor (7). Upon conclusion of the scan (e.g. all lengthwise steps have been imaged), the sample date from the sensor is stored in a data file which can then be used for further image processing or reproduction.

Turning to FIG. 2, more details of a typical linear sensor array (7) are shown. The sensor elements are uniformly spaced at distance $d_1$ from each other, or "linearly" spaced according to the function:

Position of Sensor $n = P_n = (n-1) \cdot d_1$ where the array is comprised of N sensors, n is the sensor number ranging from 1 through N, and $d_1$ is the uniform distance between the sensors. These sensors may in practice be reactive to any range of electromagnetic ("EM") spectrum according to the desired application, such as charge-coupled devices ("CCD") for visible or IR imaging.

Typically, the voltage level on each sensor element is measured and converted to a digital value relative to the amount of electromagnetic energy incident on the sensor element. Conversion to digital values are typically performed using an analog-to-digital converter having sufficient resolution (e.g. data width) for the intended application.

Additionally, mechanical and/or chemical filtering and band separation of the EM spectrum may be performed to produce "separated" data sets, such as use of color wheel or dyes on the elements to generate color-separated data sets.

As the stepper motor moves the mirror in even increments, a 2-dimensional array of image data is accumulated throughout the process representing rows (x-axis) and columns (y-axis) of data points which represent uniformly and evenly spaced samples of the original image.

Moiré patterns are artifacts of certain imaging processes which are perceptible to the human eye, but do not represent actual features or details in the original item imaged. They often resemble crosshatch halftones across all or a portion of an image. For imaging processes in which the original is an analog image, for example a photographic subject, moiré patterns may appear when certain features align with the sensors in the sensor array. For example, a digital photograph of a bug screen on a window often produces noticeable moiré patterns. Moiré patterns are most common when a new digital image is created from a digital (e.g. pixelated) source, such as scanning a newspaper photograph with a computer scanner. In this case, the resulting apparent pattern is actually an interference pattern between the physical spacing of the pixels of the original image and the spacing of the sensor array.

Just as in the phenomena of interference patterns between other types of signals, visual moiré patterns may become apparent at "harmonics" or integral multiples of spacing distances of the original image dots and the spacing distances of the sensor array. For example, if a digital image from a newspaper having a dot spacing of 600 dots per inch ("DPI") is scanned with a 600 DPI scanner, a moiré pattern will likely appear in the new image. Doubling the resolution of the scanner to 1200 DPI will not avoid the problem because 1200 DPI represents a physical harmonic of 600 DPI, nor would undersampling the image at 300 DPI.

Many techniques have been developed to try to reduce moiré patterns in existing images, such as application of image processing such as Gaussian blurring, "descreening" algorithms, and "de-speckle" processes. Most of these have a result of reducing the sharpness of the overall image because they reduce the moiré pattern by spreading energy or brightness from a given pixel to adjacent pixels. For example, turning to FIG. 3a, pixel N represents a pixel of a moiré pattern in a single row or column, and in this case, a pattern which is darker than the surrounding pixels, N−1 and N+1. The energy $E_2$ of pixel N is lower than the energy $E_3$ of the adjacent pixels N+1 and N−1. A blurring process applies a partial or weighted averaging among regional or adjacent pixels, such as shown in FIG. 3b, wherein the energy of the pixel in the Moiré pattern is slightly increased to $E_2'$, and the energy of the adjacent pixels are slightly decreased to $E_3'$.

While this oftentimes decreases the obviousness of the moiré pattern to the human observer, it also reduces the "sharpness" or level of apparent detail of the entire image. If it is applied manually on a regional basis, the degradation to the entire image may be avoided, but the local areas are still degraded and substantial human intervention may be required to do so. Additionally, "edge effects" may become perceptible where the region of processing meets a region of unprocessed image. So, to date, most post processing attempts to reduce moiré patterns either result in image degradation, require substantial human operator effort, or both to some degree.

A common technique employed to avoid the generation of moiré patterns in the imaging process is to dither the sensor array such that the array is moved in physical position with respect to the original being "scanned" or imaged. In FIG. 4, such a dithering scanner with a one-dimensional sensor array (7) is shown. A mechanical jitter drive (40) is coupled to the array (7) such that it's x-axis position is varied slightly over time, usually in a sinusoidal or triangular pattern (41). This allows the array (7) to scan a pattern of points which are not simply an array of rows and columns, but which represent positions relative to the dithering function $P_x'(t)$. As such, fewer original image sources will have an interference pattern with the dithered sensor pattern, but it is still possible that portions of the original image source may interfere with the sensor pattern to cause localized moiré patterns. Additionally, such dithering mechanisms tend to add expense and failure rate to an assembly such as a flatbed scanner.

Therefore, there is a need in the art for a system and method which avoids generation of moiré patterns in digital images without the use of mechanical dithering mechanisms, intensive image post-processing technologies, or a high degree of human operator manipulation and editing. Further, there is a need in the art for this new system and method to maintain image quality, while being readily realizable using current sensor technology, and to preferably be compatible with widely-used image compression and decompression technologies such as bitmap, JPEG point photographic experts) and MPEG image products.

SUMMARY OF THE INVENTION

The present invention provides a means for avoiding moiré patterns in digitized images by employing a one-dimensional sensor array and a process for sampling the sensor signals which produces a data set of non-uniformly spaced sensors. This allows the spacing of the sensors to avoid having an inherent "frequency" that may interfere with details or harmonics present in the image source, which eliminates the occurrence of moiré patterns and the need for application of image processing to remove moiré patterns. The sensors are placed along a one-dimensional axis in a non-uniform manner according to a predetermined scheme or function. During scanning, sensors are sampled according to the same or another non-uniform function in order to realize a similar non-uniform sampling scheme in a second dimension. Finally, linear interpolation is applied to the non-uniformly spaced data set to yield a synthesized uniformly-spaced data set for use in common imaging formats and processing, such as JPEG or MPEG compression and decompression.

BRIEF DESCRIPTION OF THE DRAWINGS

The following detailed description when taken in conjunction with the figures presented herein provide a complete disclosure of the invention.

DETAILED DESCRIPTION OF THE INVENTION

The present invention is realized in two components: a new arrangement for sensors on a one-dimension or linear sensor array, and a new process for sampling those sensors during a scanning operation. The sensors may be any useful type of sensor appropriate for the desired application, such as visible light or IR sensors (CCD), or other types of sensors.

Figure 1:
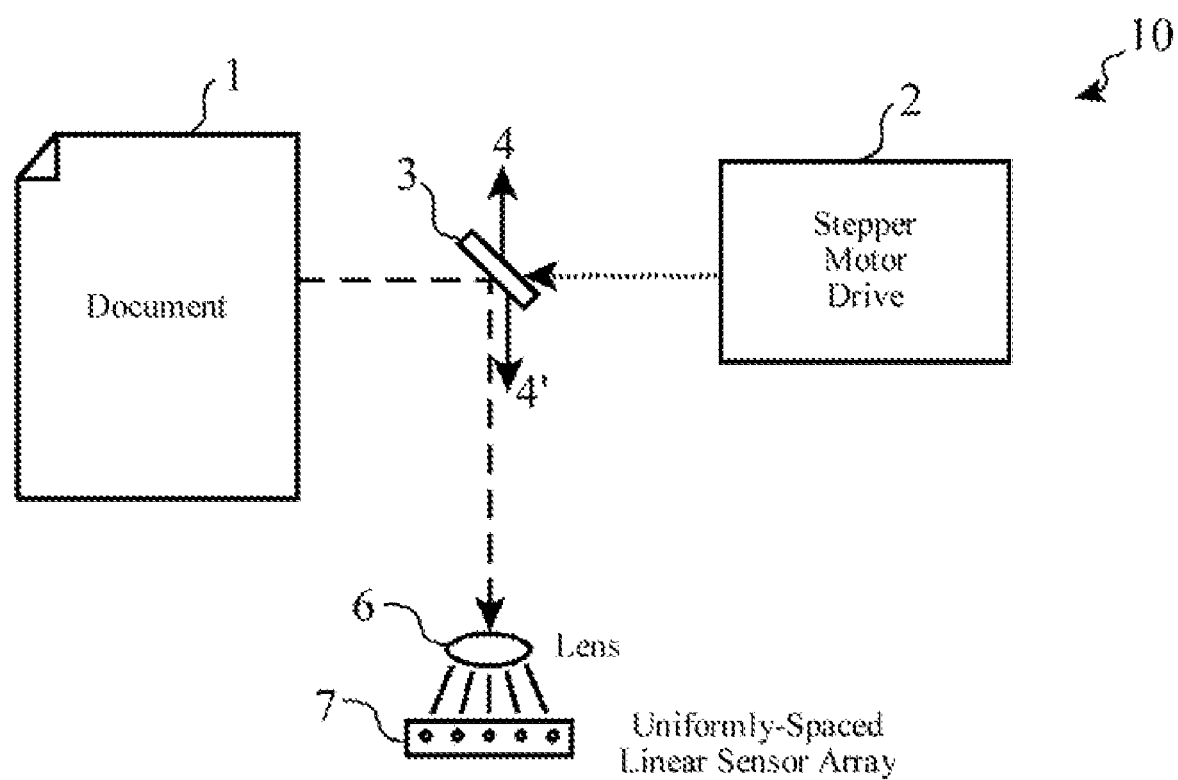
FIG. 1 illustrates the arrangement of components of an imaging system which employs a one-dimensional sensor array, such as a flatbed scanner.
Figure 2:
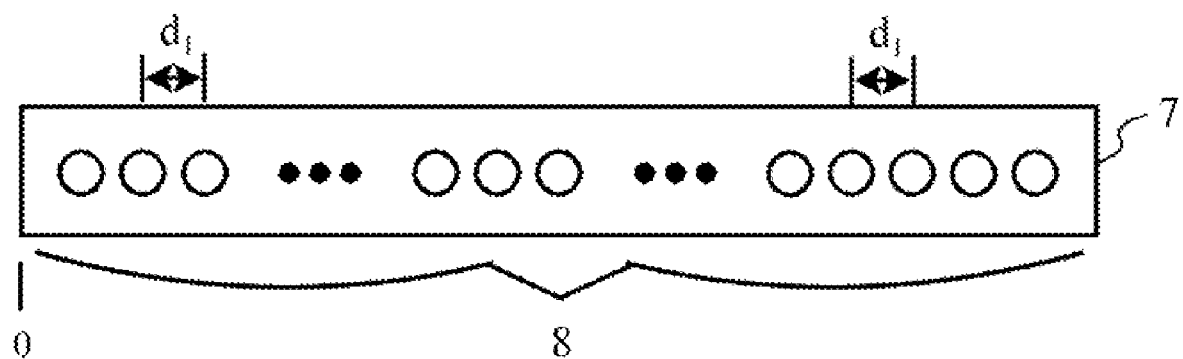
FIG. 2 shows details of a one-dimensional (e.g. "linear") sensor array.
Figure 3A:
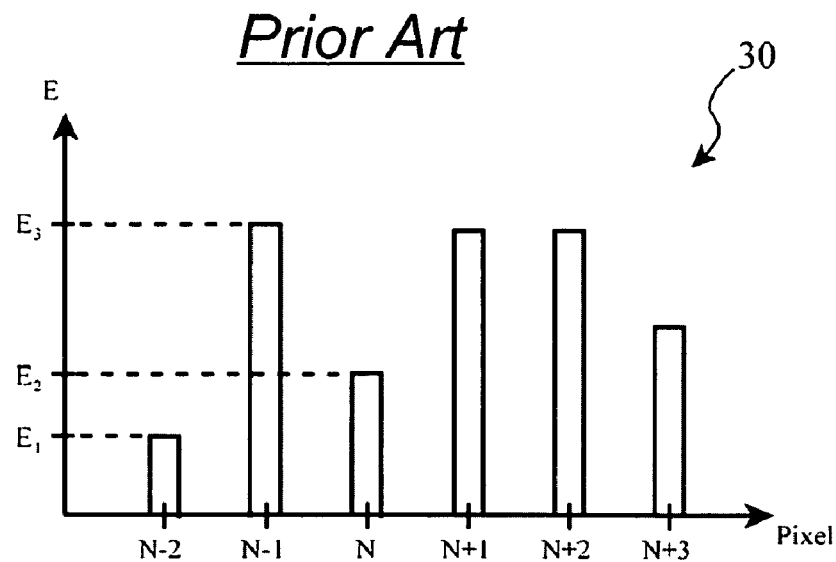
FIGS. 3a and 3b provide illustration of blurring processes often used to reduce the appearance of moiré patterns in digital images.
Figure 3B:
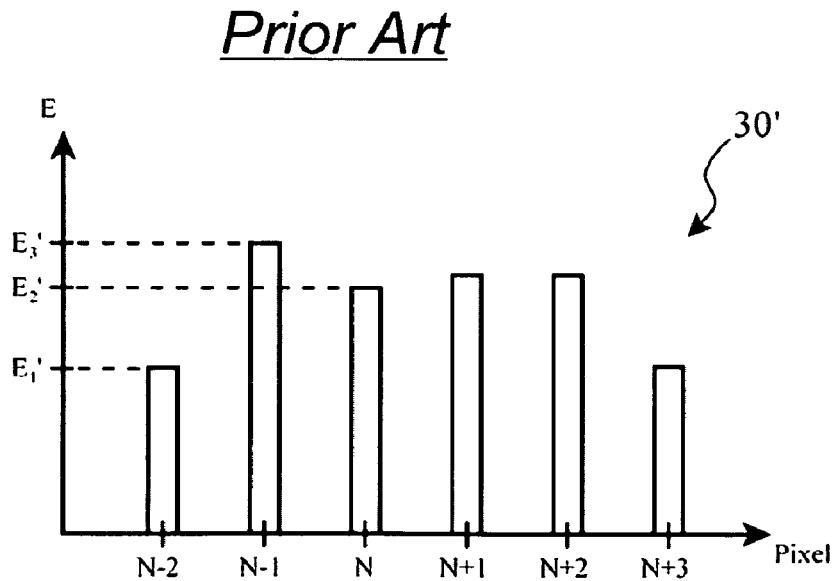
Figure 4:
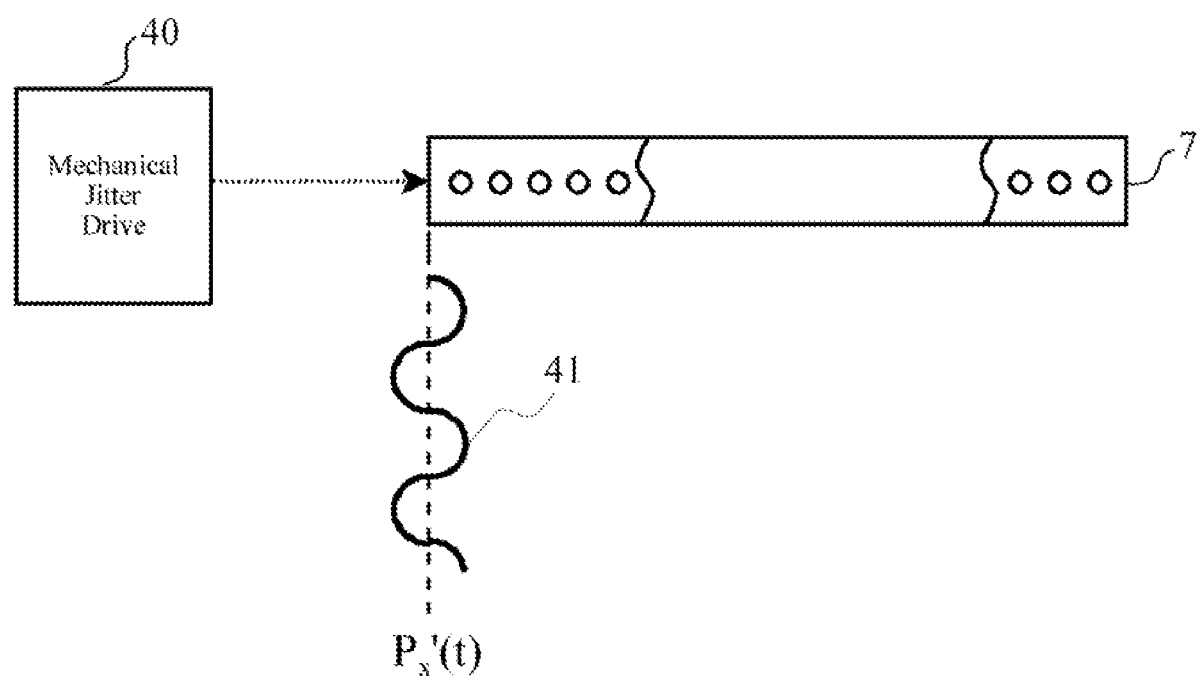
FIG. 4 shows the mechanical dithering action on a typical one-dimensional sensor array.
Figure 5:
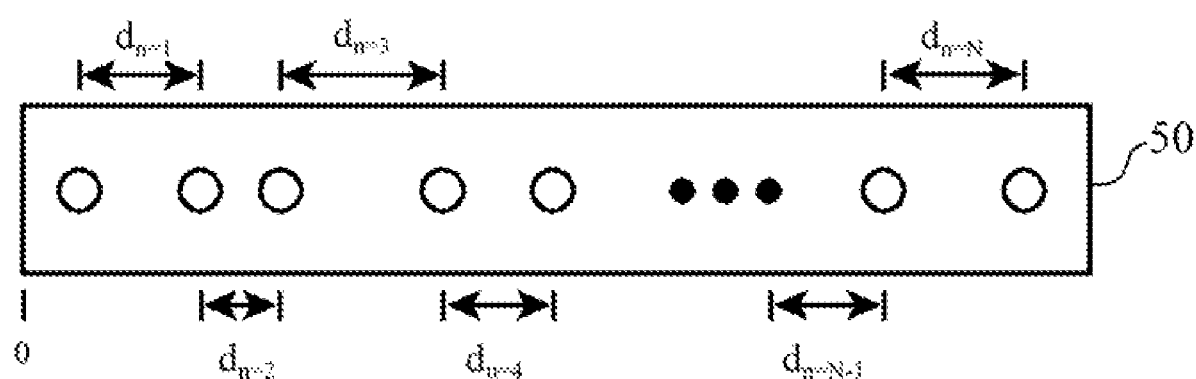
FIG. 5 illustrates the sensor placement for a one-dimensional sensor array according to the invention.
Figure 6:
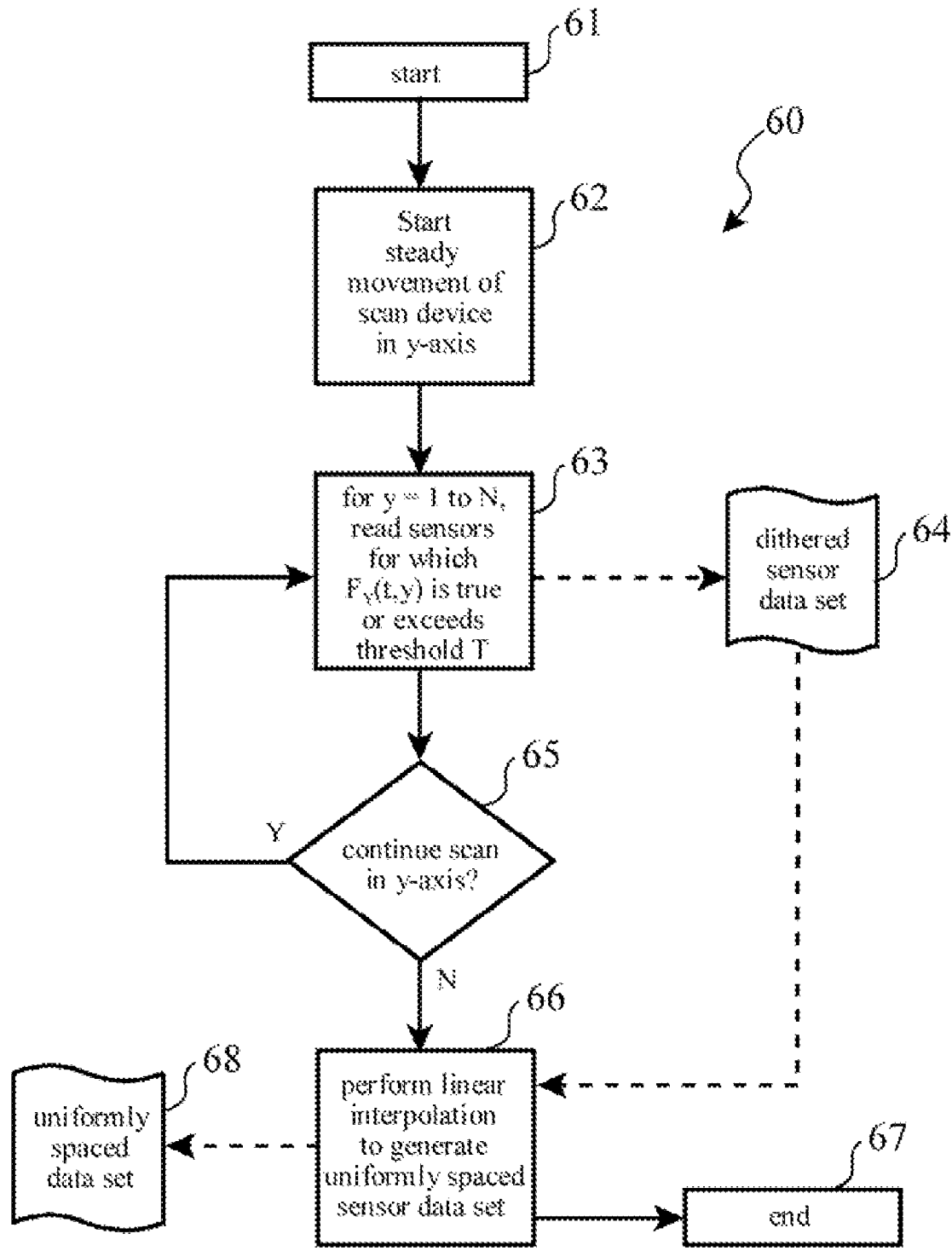
FIG. 6 sets forth the logical process of the invention to yield a data set representing uniformly-spaced sample points from the non-uniformly spaced sensor set according to the present invention.

Turning to FIG. 5, the arrangement of sensors in a linear array according to the present invention is shown. The spacing between adjacent sensors in the x-axis are non-uniform, which avoids the physical creation of a frequency in the x-axis sampling operation. For example, $d_{n=1}$ is not equal to $d_{n=2}$, and $d_{n=2}$ is not equal to $d_{n=3}$, and so forth. Further, these distances should not be harmonic multiples of each other, such as having $d_{n=1}=(\frac{1}{2}) d_{n=2}$ and $d_{n=2}=(\frac{1}{4}) d_{n=3}$, etc. As such, the function used to determine the sensor-to-sensor spacing of the one-dimensional array can be generally expressed as an offset to a standard or uniform position:

Position of sensor $n = n \cdot P_{std} + F_x(n)$ where $P_{std}$ is the standard or uniform spacing between sensors (e.g. maximum resolution), and $F_x(n)$ is a function which provides an position offset value in a non-uniform manner. For example, $F_x(n)$ may be a short, predictable pseudo-random number pattern, a nonlinear mathematical function which has broad spectral or harmonic content (e.g. ramp or sawtooth functions), or a predictable process such as a cyclic redundancy check ("CRC") polynomial.

According to one embodiment of the invention, a CRC process is used to generate the pseudo-random offset values, as this avoids the need for large look up tables and only needs three parameters to "seed" the determination of all the offset values. While the intermediate results of a CRC process produces a sequence of numbers which are pseudo-random in nature (e.g. non-uniform), CRC processes are entirely predictable in that when they are performed over the same set of data, they yield exactly the same set of intermediate values. Therefore, a predictable and repeatable number generator can be implemented by seeding a CRC process with an initial CRC value, and then recirculating the data through the algorithm for n iterations, each iteration of the process generating an intermediate value which can be converted into an offset value for sensor position n. Then, to recreate the sequence of offset values for a given array, the process must only be provided the CRC XOR polynomial, the "seed" value, and the conversion method for extracting an offset value from the CRC value at each iteration.

Table 1 shows the pseudocode for such a CRC process, in which an initial CRC value is used to start the process. Then, in each iteration of the offset determination, the current value of the CRC is exclusive-OR'ed on a bitwise basis with a polynomial, and an offset value is extracted from the modified CRC.

This offset value for the $n^{th}$ iteration is the offset value for the $n^{th}$ sensor, and can be extracted by taking certain bits from the CRC value (e.g. $b_6$, $b_4$, $b_3$, and $b_1$) of an 8-bit CRC, and concatenating them to yield an offset value in binary format. Then, this value can be scaled to range within an acceptable physical offset deviation.

Next, the modified CRC value is barrel shifted left (e.g. shifted to the left whereby the most significant bit is moved to the least significant bit) until a "1" is obtained in the least significant bit of the CRC. This shifted version of the CRC because the CRC value to be XOR'ed in the next iteration for pixel n+1.

TABLE 1

Example CRC Pseudo Random Number Generator Process

```
CRC = seed_value
For pixel = 1 to N
    CRC = CRC XOR polynomial
    offset = concatenated tap bits of CRC
    F_x(pixel) = scaled offset
    barrel shift left CRC until least significant bit is a "1"
next_pixel
```

For example, consider a CCD array which is 10.46 mm wide having 754 sensors (e.g. the standard array for a 780-wide pixel scanner), with each sensor being 6.0 μm wide. In a normal, uniformly spaced one-dimensional array, each sensor would be placed 14.0 μm from its neighbor sensor. According to the invention, a pseudo-random non-uniform function (PSNUF) having an 8-bit wide CRC ($b_7b_6b_5b_4b_3b_2b_1b_0$ with $b_7$ being the most significant bit) seed value of b'11010010 (h'D2) and an XOR polynomial of b'10011011 (h'9B), where b' denotes binary notation and h' denote hexadecimal notation.

Further, the offset values in this practical example may be determined by "tapping" and concatenating $b_6b_4b_3b_1$ from the CRC value in the $n^{th}$ iteration for the sensor n to produce a 4-bit offset value ranging non-uniformly between and including 0 and 15 in decimal notation. In this example, we may use offset values 0 through 7 to represent left offsets from the standard grid, and values 8 through 15 to represent right offsets from the standard grid. Alternatively, another bit from the CRC could be tapped as a sign bit, with left offsets being negative and right being positive, etc.

The offset value is scaled to fit the maximum offset range. In this example, if the sensor fabrication process requires a minimum spacing of 2.0 μm to maintain a desired level of anti-blooming isolation, the variance from uniform center spacing which is allowable in this situation is 14 μm less 6 μm less 2 μm, or 6 μm. So, the scaling process of Table 2 can be employed to determine the physical offset of a particular sensor.

TABLE 2

Example Offset Scaling Process

```
If 0 ≦ offset ≦ 7 then
    direction = left
    offset_distance = (offset / 8 ) * P_offset_max
else
    direction = right
    offset_distance = [(offset − 7) / 8 ] * P_offset_max
endif
```

So, in this example, the first few offset values given the seed value, polynomial and tap bits, would be 10, 7, 9, 13, 9, 7, 15, etc., for the first, second, third, etc., sensors. After scaling, the physical offsets would be right 2.25 μm, left 5.25 μm, right 1.5 μm, right 4.5 μm, etc., for the first, second, third, etc., sensors.

Employing such a distribution function, a new one-dimensional array is preferably fabricated with the non-uniformly spaced sensors according to the function $F_x$ instead of the uniform spacing of prior art sensor arrays. This is preferably done in the silicon design and layout, such as the phase of design of a CCD sensor. This allows for the manufactured sensor to have incorporate the sensors with the x-axis spacing of the function $F_x$ such that when it is used for scanning in the x-axis, moiré patterns will not form in the image in the x-axis.

However, as a scanning system sequentially images "lines" in the y-axis, a moiré pattern may form in the y-axis. Therefore, one available embodiment of the invention further includes a process for non-uniformly sampling or storing the data values from the one-dimensional sensor array. To decrease computational intensity of the linear interpolation necessary to later yield a synthesized data set for uniformly-spaced data samples (described later), the same function or a similar function $F_y(m)$ may be employed, where m is the position of the scan in the y-axis (e.g. row position). Preferably, the stepper motor of a typical scanner assembly is replaced with a linear-motion motor, which reduces the cost and increases the reliability of the assembly, and allows m to be a function of the time into the scanning process.

So, $F_y(m)$ may be a short, predictable pseudo-random number pattern, a nonlinear mathematical function which has broad spectral or harmonic content (e.g. ramp or sawtooth functions), or preferably a cyclic redundancy check ("CRC") as previously described, with the scaling step (Table 2) adapted to the range the offset between a minimum value of 0 and a maximum value of one full uniform step in the y-axis. Also according to one embodiment of the invention, the same CRC process (Table 1) can be used with the same XOR polynomial value can be utilized for determining the y-axis offset values, but preferably a different seed value of the CRC is used to further randomize the non-uniform spacing of the sample points in the two dimension of the scan. For example, using the 8-bit CRC process previously described with a seed value of b'10110111 (h'B7) and an XOR polynomial of b'10011011 (h'9B), and tap bits $b_6b_4b_3b_1$ taken from the CRC value in the $n^{th}$ iteration for a sensor n, the offset value sequence produced would be 2, 15, 11, 1, 3, 11, 4, 7, etc., for the first, second, third, etc., sensors.

Figure 7:
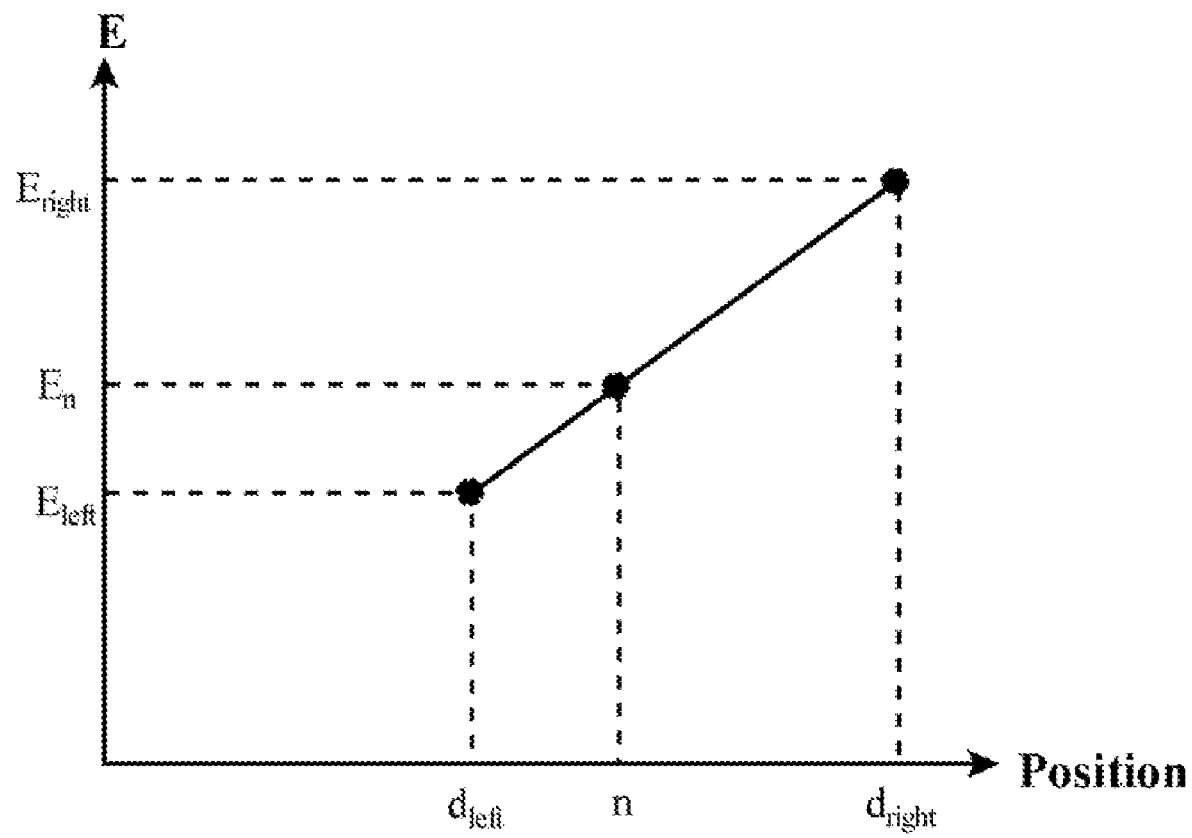
FIG. 7 graphically depicts a linear interpolation process according to the present invention.

After the scan is complete (or concurrent with data sample collection), a linear interpolation may be performed between each non-uniformly spaced data sample to create synthesized data values for a uniformly-spaced data set. For example, as shown in FIG. 7, for a pixel at column n in a given row in a uniformly spaced data set (68), the closest surrounding data values from the non-uniformly spaced data set (64) may be used to calculate its value using linear interpolation as such:

$$E_n = \{(d_{left}/d_{left}+d_{right})\cdot(E_{right}-E_{left})\}+E_{left}$$

where $E_n$ is the data value (energy, brightness, etc.) for the interpolated pixel on the given row, $d_{left}$ is the distance from the interpolated pixel to the closest actual data sample to the left (in the x-axis) and $E_{left}$ is the data sample value of that left neighbor; $d_{right}$ is the distance from the interpolated pixel to the closest actual data sample to the right (in the x-axis) and $E_{right}$ is the data sample value of that right neighbor. This produces a linearly interpolated value along the x-axis only, which is sufficient for many applications. In some applications, however, a nonlinear interpolation may be in order (e.g. when using sensors with a nonlinear sampling characteristic), and interpolation considering adjacent row data samples in the y-axis (e.g. above and below) may be employed.

So, an array of evenly spaced data samples (68) for n=1 to N columns and for m=1 to M rows, is preferably generated from the dithered data set (64), which can then be readily processed by common image compression and decompression technologies such as JPEG and MPEG utilities.

By employing the spacing technique of the sensors in the one-dimensional array in conjunction with the scanning process of the invention, a two-dimensional image data set which is free of inherent sensor spacing frequencies can be obtained which avoids the creation of moiré patterns in the first place. By further employing the interpolation process according to the predefined non-uniform spacing function of the pixel positions in both axes, a synthesized uniformly-spaced data set may be yielded which is compatible with other well-known image technologies and applications.

According to an advanced realization of the invention, each non-uniformly spaced sensor is assigned a reference identifier which is associated with a particular distribution function. In this way, a sensor manufacturer may produce a number of sensors having the same distribution pattern, and users of those arrays may interpret the data according to the manufacturer's specification of the distribution function. For the one-dimensional array of the previous example, the seed value could be combined with the polynomial value to identify its distribution scheme, such as D29B. The same reference identification process can be applied to the y-axis time-based sampling process of the invention, as well, so that the data file which contains the data samples from the non-uniformly spaced sensors in two dimensions can also be identified with both x- and y-axis seed and polynomial values, such as D29B-B79B in our example.

It is further recommended that data files containing samples from such arrays and sampling processes be identified, either within the file (e.g. a header area) or in naming convention, so that other processes may properly identify the distribution function of the sample data.

Further, industry consortiums could determine standards for distribution functions such that multiple manufacturers could produce "compatible", equivalent or interchangeable sensor arrays and data files.

While certain details of one or more embodiments have been disclosed, and certain examples have been given to illustrate the invention in a more understandable manner, it will be recognized by those skilled in the art that the spirit and scope of the present invention is not limited to these examples and embodiment details. For example, certain terms including x-axis, y-axis, left, right, above and below, have been adopted to give a frame of reference. These terms, however, should not be interpreted in a limiting manner, as other terms such as horizontal/vertical, radial/angular, north/south/east/west, etc., can be used to describe the invention in other frames of reference.

Further, the invention may be employed for a wide range of information gathering and imaging applications, not just photographic and visible spectrum imaging, such as magnetic resonance imaging, radar and sonar imaging, etc. Therefore, the scope of the present invention should be determined by the following claims.

What is claimed is:

1. A method comprising the steps of:
providing a plurality of image sensors at positions in a row arrangement non-uniformly distributed with varying distances between each adjacent pair of sensor positions determined according to a first predictable deterministic schema, wherein said first predictable deterministic schema avoids harmonics and integral multiple of spacings that produce Moiré patterns in a captured digital image, said first predictable deterministic schema comprising a cyclic redundancy check polynomial;
selectively sampling an image by sequentially exposing image portions to said row arrangement to obtain a first set of data samples representing non-uniformly spaced points according to said first predictable deterministic schema in said image; and
producing a sampled digital image containing said first set of data samples associated with a reference identifier of said deterministic schema, wherein said digital image comprises pixel data at points spaced according to said first predictable deterministic schema and wherein said image is free of Moiré patterns.

2. The method as set forth in claim 1 wherein said first predictable deterministic schema comprises a pseudo-random schema.

3. The method as set forth in claim 1 wherein said first predictable deterministic schema comprises a nonlinear polynomial schema.

4. The method as set forth in claim 1 further comprising the step of assigning a reference identifier to said first predetermined schema.

5. The method as set forth in claim 1 wherein said step of sampling an image by sequentially exposing image portions to said row arrangement comprises selectively sampling according to a second predictable deterministic schema such that each sensor position is sampled in a non-uniformly varying spatial manner.

6. The method as set forth in claim 5 wherein said second predictable deterministic schema comprises a pseudo-random schema.

7. The method as set forth in claim 5 wherein said second predictable deterministic schema comprises a nonlinear polynomial schema.

8. The method as set forth in claim 5 further comprising the step of assigning a reference identifier to said second predictable deterministic schema.

9. The method as set forth in claim 1 further comprising the step of interpolating a set of data samples representing uniformly spaced data samples from said first set of data samples, wherein said interpolation comprises a compensation for said non-uniform spacing of pixel points in said data samples.

10. An article of manufacture comprising:
a computer readable memory suitable for encoding software; and
one or more computer software programs encoded by said computer readable memory configured to cause a processor to perform the steps of:
sequentially exposing image portions to plurality of image sensors positioned in a row arrangement non-uniformly distributed with varying distances between each adjacent pair of sensor positions determined according to a first predictable deterministic schema, wherein said first predictable deterministic schema avoids harmonics and integral multiple of spacings that produce Moiré patterns in a captured digital image, said first predictable deterministic schema comprising a cyclic redundancy check polynomial;
selectively sampling said sensors to obtain a first set of data samples representing non-uniformly spaces points according to said first predictable deterministic schema in said image; and
producing a sampled digital image containing said first set of data samples associated with a reference identifier of said deterministic schema, wherein said digital image comprises pixel data at points spaced according to said first predictable deterministic schema and wherein said digital image is free of Moiré patterns.

11. The article as set forth in claim 10 wherein said predictable deterministic schema comprises a pseudo-random schema.

12. The article as set forth in claim 10 wherein said predictable deterministic schema comprises a nonlinear polynomial schema.

13. The article as set forth in claim 10 further comprising software for interpolating a second set of data samples representing uniformly spaced data samples from said first set of data samples.

14. A system comprising:
 a plurality of image sensors positioned in a row arrangement distributed with varying distances between each adjacent pair of sensor according to a first predictable deterministic schema, wherein said first predictable deterministic schema avoids harmonics and integral multiple of spacings that produce Moiré patterns in a captured digital image, said first predictable deterministic schema comprising a cyclic redundancy check polynomial;
 an image sampler configured to sample an image by sequentially exposing image portions to said row arrangement to obtain a first set of data samples representing non-uniformly spaced points according to said first predictable deterministic schema in said image; and
 a sampled digital image containing said first set of data samples and associated with a reference identifier of said deterministic schema, wherein said digital image comprises pixel data at points spaced according to said first predictable deterministic schema and wherein said digital image is free of Moiré patterns.

15. The system as set forth in claim 14 wherein said first schema for sensor positioning comprises a schema selected from the group of a pseudo-random schema and a nonlinear polynomial schema.

16. The system as set forth in claim 14 wherein said sampler is further configured to selectively sample according to a second predictable deterministic schema such that each sensor position is sampled in a varying spatial manner.

17. The system as set forth in claim 16 wherein said second schema comprises a schema selected from the group of a pseudo-random schema and a nonlinear polynomial schema.

18. The system as set forth in claim 14 further comprising a means for generating a uniformly-spaced data sample by interpolating said first set of data samples.

* * * * *